(12) United States Patent
Wieschermann et al.

(10) Patent No.: US 7,243,988 B2
(45) Date of Patent: Jul. 17, 2007

(54) ROOF UNIT AND BASIC STRUCTURE OF A ROAD-BOUND VEHICLE

(75) Inventors: Jochen Wieschermann, Salem (DE); Duri Deflorin, Horgen (CH); Wolfgang Muller, Wermelskirchen (DE)

(73) Assignees: Alcan Technology & Management Ltd., Neuhausen (CH); Johnson Controls Headliner GmbH, Wuppertal (DE)

( * ) Notice: Subject to any disclaimer, the term of this patent is extended or adjusted under 35 U.S.C. 154(b) by 0 days.

(21) Appl. No.: 11/037,654

(22) Filed: Jan. 18, 2005

(65) Prior Publication Data

US 2005/0120642 A1      Jun. 9, 2005

Related U.S. Application Data

(60) Division of application No. 10/635,660, filed on Aug. 5, 2003, now Pat. No. 6,860,014, which is a continuation-in-part of application No. 10/114,003, filed on Apr. 1, 2002, now abandoned, which is a division of application No. 09/719,941, filed as application No. PCT/CH99/00254 on Jun. 11, 1999, now abandoned.

(30) Foreign Application Priority Data

Jun. 18, 1998   (CH) ..................................... 1309/98

(51) Int. Cl.
*B62D 25/06* (2006.01)

(52) U.S. Cl. ....................... 296/210; 296/214; 296/1.02
(58) Field of Classification Search ................ 296/210, 296/214
See application file for complete search history.

(56) References Cited

U.S. PATENT DOCUMENTS

| 3,127,213 A | 3/1964 | Klaasen |
| 3,635,519 A | 1/1972 | Foster et al. |

(Continued)

FOREIGN PATENT DOCUMENTS

| DE | 2140365 | 2/1972 |

(Continued)

*Primary Examiner*—Joseph D. Pape
(74) *Attorney, Agent, or Firm*—Klaus P. Stoffel; Wolff & Samson PC

(57) ABSTRACT

A roof unit having an outer skin, an inward facing ceiling, whereby the outer skin and the ceiling are combined to form a unit ready for installation, a base structure having longitudinal frames. The ceiling and the outer skin along with the basic structure have joining configurations that mate the ceiling and the outer skin to the base structure at mutual places for joining. The ceiling has a sandwich structure including a middle layer of foam, at least one side of the middle layer being provided with one of a fiber mat and a glass fiber fleece and at least one of a plastic film, a cover film, a decorative overlay and a functional overlay.

1 Claim, 13 Drawing Sheets

U.S. PATENT DOCUMENTS

| | | | |
|---|---|---|---|
| 4,059,303 A * | 11/1977 | Mauri | 296/203.01 |
| 4,119,794 A | 10/1978 | Matsuki | |
| 4,149,749 A | 4/1979 | Canal | |
| 4,444,705 A | 4/1984 | Kumasaka et al. | |
| 4,553,309 A | 11/1985 | Hess et al. | |
| 4,598,008 A | 7/1986 | Vogt et al. | |
| 4,759,489 A | 7/1988 | Pigott | |
| 4,957,326 A | 9/1990 | Chiba et al. | |
| 5,120,593 A | 6/1992 | Kurihara | |
| 5,269,060 A | 12/1993 | Dowd et al. | |
| 5,599,059 A * | 2/1997 | Shann | 296/216.04 |
| 5,688,022 A | 11/1997 | Adams et al. | |
| 5,976,646 A | 11/1999 | Stevens et al. | |
| 6,102,472 A | 8/2000 | Wallstrom | |
| 6,120,091 A | 9/2000 | Reich et al. | |

FOREIGN PATENT DOCUMENTS

| | | |
|---|---|---|
| DE | 2952510 | 7/1980 |
| DE | 7929367 | 2/1981 |
| DE | 3540814 | 5/1987 |
| DE | 3809456 | 10/1988 |
| EP | 170086 | 2/1986 |
| EP | 2506780 | 1/1988 |
| WO | WO 99/16659 | 4/1999 |

* cited by examiner

ROOF UNIT AND BASIC STRUCTURE OF A ROAD-BOUND VEHICLE

CROSS-REFERENCE TO RELATED APPLICATIONS

This is a divisional application of U.S. patent application Ser. No. 10/635,660, filed Aug. 5, 2003 now U.S. Pat. No. 6,860,014 issued Mar. 1, 2005, which is a continuation-in-part of U.S. patent application Ser. No. 10/114,003, filed Apr. 1,2002 now abandoned , which is a divisional of U.S. patent application Ser. No. 09/719,941, filed on Dec. 18, 2000, abandoned, which is a 35 U.S.C. §371 national phase of International Application No. PCT/CH99/00254, filed on Jun. 11, 1999. Priority is claimed on that application and on the following application:

Country: Switzerland, Application No. 1309/98, Filed: Jun. 18, 1998.

BACKGROUND OF THE INVENTION

1. Field of the Invention

The present invention relates to a process for manufacturing a vehicle body with a roof unit containing an outer skin and an inward facing ceiling, or an outer skin and an inward facing ceiling with a ceiling frame, whereby the roof unit is in the form of a unit ready for installation and, a basic structure, and the ceiling and the outer skin along with the basic structure feature configurations for joining that mate with each other at their mutual places for joining, this for a body of a road-bound vehicle fitted together horizontally, and particular roof units.

2. Discussion of the Prior Art

It is known that manufacturing concepts for powered vehicles make use of individual modules that can be assembled separately. This concerns in particular the whole of the dash-board including the cockpit. Further, described in the book Horst Pippert, Karosserie-technik, Vogel-Fachbuch, Vogel Publishers, Würzburg, 1989, pp 242 and 244, is that horizontal separation of the roof and base units can be useful. Before final assembly, individual fittings may be readily added to the base unit. A process for manufacturing a horizontally separated vehicle body is described in EP-B 0 250 678.

Known from DE 79 29 367 U is a roof structure for powered vehicles having an outer skin and a roof frame that form a unit which can be attached to the columns of the vehicle body. The outer skin of the roof is joined along its edges to a profiled section frame, which is attached to the columns of the vehicle body.

Separate manufacture of roof and floor units or basic structure was hardly adopted for series production purposes as the fitting together and joining of the roof to the base unit is difficult, or at least complicated, and the overall stability of a vehicle body—and with that its structural strength—is made worse compared with a body with side walls reaching up to the roof.

Methods of manufacturing the rough bodywork from floor units and outer sheets suffer the disadvantage that the subsequent fitting out of the vehicle, e.g. installing all components in the region of the roof and the window posts, involves mounting or fitting these from the inside of the body frame. The freedom of movement for a person or a machine in a finished vehicle body is very limited. Consequently, manual work is tiresome, and in some cases it is not possible to make use of robots.

SUMMARY OF THE INVENTION

The object of the present invention is to propose a process for manufacturing a vehicle body with a roof unit and a base unit or basic structure for a horizontally joined body of a road-bound vehicle, such that the roof unit makes manufacturing simple, and the joining of the roof unit and the basic structure is easy, in particular in conveyor-belt series production.

Preferably, at least the outer side of the roof unit bears a coating of paint, wholly or partially, on the parts that are visible from the outside or are exposed to weathering. The paint may be a single or multi-layer coating e.g. of undercoat, filler, top coat and/or a transparent organic coating etc. The paint can therefore already be applied to the roof unit prior to joining the basic structure and roof unit.

The roof unit may contain e.g. the outer skin or the outer skin with longitudinal and/or cross member(s) and the ceiling, if desired also a frame for the ceiling. The roof unit may also be essentially a single shaped part making up the outer skin and the ceiling. Further, the roof unit may feature means for joining the longitudinal frame, the transverse frame and/or the side wall columns such as A, B, C and if present, D columns, window frames, especially those for fixed stationary windows or frameless windows in the doors. The roof unit may also contain components such as roofs that slide open, can be raised, folded and lamella type roofs, or rigid or moveable glass roofs and their frame parts, also elements for moving the same, roof-rack rails, antennae, and interior fittings such as covering materials, hand grips in the roof area, sun blinds, interior lighting, cables, operating and display elements, modules for series-type airbags at the sides, window airbags, head/shoulder airbags etc.

The base unit or basic structure may e.g. be in any prefabricated form. Preferred is a base unit —with respect to the interior fittings—such featuring wiring, floor covering, seats, operating elements, instruments etc.—to a large degree prefabricated, in order to minimize further worksteps in the vehicle interior formed by joining the roof and base units or basic structure.

The outer roof skin and also the ceiling frame may be made up of one or more parts and of various materials. Suitable materials are metals, plastics or combinations thereof. Preferred metals are ferrous and non-ferrous materials, in particular light weight metals. Included in the group of light weight metals are aluminum and its alloys and magnesium and its alloys. The outer skin of metal may be in the form of sheet or—in particular in the case of aluminum or magnesium—in the form of a foamed shaped body or extruded section. Ceiling frames may be e.g. of metal in particular aluminum or magnesium or their alloys and as stamped, pressed or extruded parts. Examples of plastic-based materials for outer roof skins, ceiling and ceiling frames are polyamides, including polyamides of diamines and aromatic dicarbonic acid (Aramides), polyesters, epoxy resins, polyurethanes, polyvinylchlorides, polycarbonates, acrylnitrile-styrene copolymers, acrylnitrile-butadiene-styrene copolymers (ABS), polyolefins etc. The plastics may be fiber-reinforced plastics—such as plastics reinforced with glass or carbon fibers. The plastics may contain filler materials. The plastics may be in foamed of non-foamed state, including closed cell and open cell foams and may be present both as hard or soft foams. The outer roof skin, the ceiling and the ceiling frames may also be made up of a combination of metals and plastics such as composites, also known as laminates or sandwich materials. The composites may have various plastic layers or feature at least one sheet or section of metal and at least one plastic layer. The ceiling frame may be a shaped part of plastic such as in injection molded part, a foamed shaped part or may be of metal in particular light weight metals such as aluminum or magnesium in the form of a stamped, pressure diecast part or as an extruded section, or a combination of plastic and metal. The ceiling frame may be painted or covered with material.

The outer roof skin may be in the form of a laminate with a metal or plastic layer forming the outer side and, facing inwards, at least one foamed or non-foamed plastic layer. The outer roof skin and the ceiling and possibly the ceiling frame, as one and the same shaped part or as separate shaped parts, may also be shaped parts with integral foam with a closed, solid edge region that—moving away from the edge, gradually has the form of a fine-pored structure. Also, fiber matting with fibers of glass, cotton, flax or coconut etc. may be provided between the roof outer skin and the ceiling, or as ceiling itself or within a ceiling-laminate, from case to case as desired. By appropriate choice of layer thickness and materials laminates may in particular be designed for optimal dampening of resonance and noise.

The ceiling may be a covering e.g. of leather, artificial leather, textiles, plastic films etc. These materials may be drawn over e.g. A shape-determining support of plastic, metal, foamed mats, foamed bodies, stiffened fiber matting etc. The ceiling may e.g. also be a shaped part of plastic, foamed plastic or integral foam such as e.g. mentioned above for the roof outer skin. The ceiling may have a sandwich structure comprising a middle layer of foam e.g. polyurethane foam, fiber mats or fiber-glass fleece etc., on one or both sides and, may feature on one or both sides, plastic films, cover films and/or decorative or functional covers. The ceiling may also include a ceiling frame.

The basic structure is closed off at the top by the ceiling frame comprising e.g. longitudinal members at the side or longitudinal members at the side with front and rear cross members arranged between them, or with the side wall columns and front and rear cross members.

Usefully, the roof unit contains the outer skin with con-figuration for connecting to the ceiling frame, such as a longitudinal member and/or a front and rear cross member and/or the side wall columns such as A and C columns and if present B and D columns.

The outer skin of the roof may e.g. also be a single piece shaped part with configuration for connecting to the ceiling frame, cross members and/or the side wall columns such as A and C columns and if present B and D columns.

The roof unit preferably contains an outer skin and a ceiling frame with longitudinal members arranged at the sides of the outer skin and/or front and rear cross members. Another preferred version is such that the roof unit contains the outer skin and the ceiling frame, the ceiling frame being one single shaped part.

Usefully, the outer skin and/or the ceiling frame contains fittings. The fittings include e.g. one or more of the following parts: ceiling cover, other interior cladding, cushioning against impact, sun shields, interior back-mirror, interior lighting, wiring, operating and display elements, sliding, raising, folding, lamellar and glass roofs and their frame parts and corresponding drive elements, roof hand grips etc. The outer skin may also feature outward facing attachment means for antennae, roof fittings such as luggage rack or rails.

Especially preferred are roof frames or side wall columns or cross members that feature connecting elements to which the corresponding configurations for connecting on the ceiling frame or the outer skin may be attached. Suitable configurations for connecting purposes on the ceiling frame or side wall columns or cross members are bolting, riveting, form-fit, clip or push-fit type connections etc. For example the configuration connecting facility of the roof unit could be the means of attachment for the roof hand grips and/or the sun shields. Belonging to the wiring in the roof unit are in particular push-fit connections which are preferably situated at the mutual joining points on the roof and base units; the continuation of these is in the corresponding wiring with corresponding push-fit connections in the basic structure.

The scope of the present invention includes the production of the horizontally assembled vehicle-body comprising roof and basic structure.

The production process is e.g. performed in such a manner that the basic structure with respect to interior fittings such as seats, dashboard, operating elements etc. is to a large extent pre-fabricated. The basic structure terminates at the top e.g. with the longitudinal members at the sides and, with respect to the roof, a front and rear cross member. The ceiling, which in some case contains a ceiling frame, is in introduced through the opening for the rear or front window and, by means of an upward movement, is brought into contact with the matching con-figuration points for connection on the longitudinal frame members at the side and/or the front and rear cross members where it is fixed into place. The ceiling may already have fittings attached to it. The ceiling may be connected to the longitudinal members and/or to the cross members via configurations for joining such as bolting or push-fit connections which are foreseen e.g. for attaching the hand grips and/or the sun shields. Subsequently, further fittings may be added as required. In a further step the outer skin is brought into contact with the corresponding configuration for joining on the longitudinal members at the side and the front and rear cross members by lowering it, and then permanently attached there. The outer skin may be attached by adhesive bonding, welding, bolting, riveting, clamping, engaging by fit and shape, clinching or a combination of the different means of attachment. Welding methods are in particular friction welding, MIG, TIG or laser welding.

The production process is performed in another manner which is e.g. such that the basic structure is to a large extent pre-fabricated with respect to interior fittings such as seats, dashboard, operating elements etc. The basic structure terminates at the top e.g. with the longitudinal members at the sides and, with respect to the roof, and a front and rear cross member. The ceiling frame is in introduced through the opening for the rear or front window and, by means of an upward movement, is brought into contact with the corresponding configuration points for connection on the longitudinal frame members at the side and/or the front and rear cross members where it is fixed into place. The ceiling frame may already have fittings attached to it. The ceiling frame may be connected to the longitudinal members and/or to the cross members via configurations for joining such as bolting or push-fit connections which are foreseen e.g. for attaching the hand grips and/or the sun shields. Subsequently, further fittings may be added as required. In a further step the ceiling is lowered onto the ceiling frame and in some cases joined permanently to it. Finally the outer skin is lowered onto the corresponding configuration for joining on the longitudinal members. at the side and the front and rear cross members and permanently joined there. The outer skin may be attached by adhesive bonding, welding, bolting, riveting, clamping, engaging by fit and shape, clinching or a combination of the different means of attachment. In this process it is also possible to prefabricate the ceiling and outer skin by joining them together to make a unit out of them, to lower this unit onto the ceiling frame and the corresponding configuration for joining on the longitudinal members at the sides and the front and rear cross members, and thereafter to join them permanently together.

The production process is performed in yet another manner which is e.g. such that the basic structure is to a large extent prefabricated with respect to interior fittings such as seat, dash-board, operating elements etc. The basic structure terminates at the top e.g. with the longitudinal members at the sides. The roof unit—comprising outer skin, ceiling or ceiling and ceiling frame and a front and rear cross member, in each case with fittings already mounted—is in introduced between the two longitudinal members and, by means of an upward movement, is brought into contact with the corresponding configuration points for connection on the longitudinal frame members where it is fixed into place. The ceiling or ceiling frame may be connected to the longitudinal members via configurations for joining such as screw-type or push-fit connections which are foreseen e.g. for attaching ceiling hand grips. The ceiling is joined to the longitudinal members by means of further configurations for that purpose e.g. by interlocking by virtue of shape and fit. The further configuration for joining may e.g. be in the form of a rib or ribs, or bulge or bulges, running along the side of the outer skin and corresponding groove or grooves, or rib or ribs, running along the longitudinal members. Adhesive and/or sealing masses are preferably provided in the region of the joint made by the rib and groove, or the bulge and groove. Possible means of joining the longitudinal members and the outer skin in the region of their mutual configuration for joining are adhesive bonding, welding, clamping, clinching, riveting, bolting, either alone or a combination of the different means of attachment.

The production process is performed in yet another manner which is such e.g. that the basic structure is to a large extent pre-fabricated with respect to interior fittings such as seats, dash-board, operating elements etc. The basic structure terminates at the top e.g. with the side wall columns. The side wall columns feature a configuration for attachment purposes. The roof unit may be already feature fittings installed in it. The roof unit features the ceiling or ceiling and ceiling frame. A configuration for joining to the side wall columns is provided on the ceiling or on the ceiling frame. For example by lowering, raising or inserting the roof unit from the front or rear, the points of mutual configuration are brought into contact with each other and joined permanently together. Suitable configurations for joining are tongue and groove, shoulder section and contact strips, cogged sections, plugs such as conical plugs and holes, wedges engaging in slits, channel sections that engage on a projection etc.

Adhesive joints may be made using adhesives. Examples of adhesives are—apart from the physical bonding adhesives—the particularly suitable chemically bonding adhesives. Belonging to the chemically bonding adhesives are reaction type adhesives such as the two component adhesives with epoxy resins and acetic anhydrides, epoxy resins and polyamines, polyisocyanates and polyols or the single component adhesives cyanacrylates or methacrylates, the two component adhesives out of unsaturated polyesters and styrene or methacrylates, the single component adhesives of phenoplasts and polyvinyl acetalene or nitrile-caoutchoucs, the two component adhesive s of pyromellite acetic anhydride and 4.4-diamineo-diphenyl-ether forming polyimides or of poly-benzimide-azoles. Adhesives that form duroplastics or possibly elastic compounds are to be preferred.

At the areas or edges of contact between the roof and the basic structure, and between the ceiling and ceiling frame, provision may be made for clamping and/or sealing profiled sections, edge sections, closing off sections etc., of elastic materials, sealing strips or sealing masses etc.

The roof units according to the invention find preferential application for road bound vehicles such as private cars and the like or for the driver's cabin in lorries. Included in the category of private cars are e.g. 2-door and 4-door limousines, two-seater cars, estate cars, vans and small buses.

With the roof units described above it is possible to fabricate the basic structure almost to completion, whereby the roof initially remains open, and the opening in the roof remains available as workspace and for introducing fittings. This provides an efficient production method for fitting out the basic structure, followed by simple addition of the roof unit to the basic structure.

BRIEF DESCRIPTION OF THE DRAWINGS

Various exemplified embodiments of the object of the invention are explained in greater detail in the following with the aid of drawings viz..

DETAILED DESCRIPTION OF THE PREFERRED EMBODIMENTS

Figure 1:
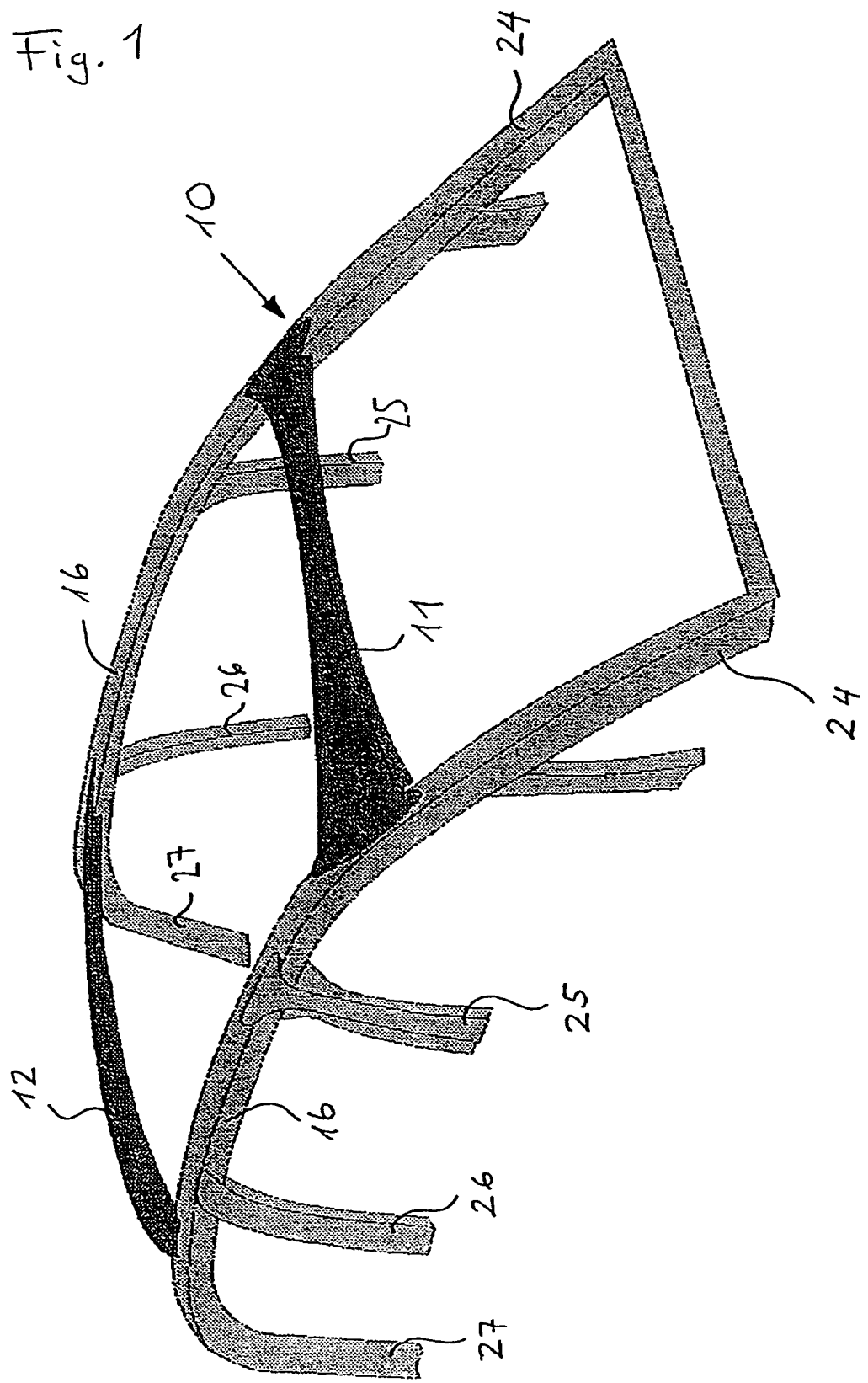
FIGS. 1 to 4 showing the first version of the assembly of a roof unit on a basic structure, the roof unit being mounted on the basic structure in several steps.

Shown in FIG. 1 is a basic structure 10 of a vehicle body which already has the side wall columns 24, 25, 26, 27, the front and rear cross frames 11 and 12 and the longitudinal frame members 16. The basic structure 10 may feature further component parts; as these are not pertinent to the object of the invention they not shown here.

Figure 2:
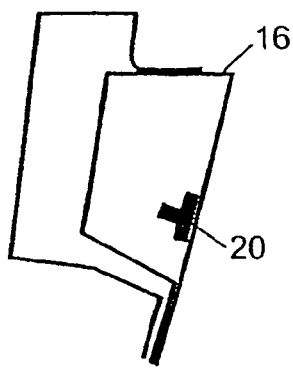

FIG. 2 shows a cross-section through a longitudinal frame member 16 which represents the upper limit of the basic structure 10. The longitudinal frame features an extrusion seal 19, and a connecting element 20 features e.g. an internal thread, a sleeve etc. When the car body is being assembled, the roof unit is fitted onto the largely prefabricated basic structure 10.

Figure 3:
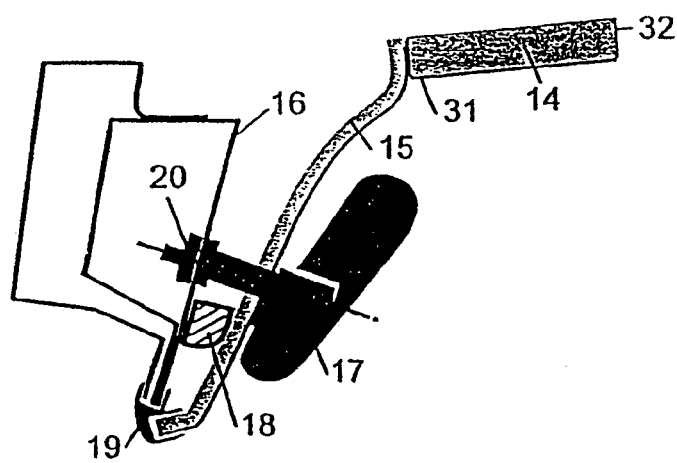

FIG. 3 shows further parts that can be built onto the basic structure 10 e.g. the ceiling 14, such as a foamed body 32 covered with a lining 31, ceiling frame 15 and airbag module 18 e.g. for side wall airbags, window airbags or head/shoulder airbags. During production of the vehicle, the ceiling 14 along with the ceiling frame 15 is inserted through the front or rear window opening and, in an upwards movement, the ceiling frame 15 brought up to the points for connecting it to the longitudinal frame members 16. The ceiling frame 15 is joined to the longitudinal frame members 16—one of various possible attachment points—via the attachment of the roof hand-grip 17, which in turn is secured to the connecting element 20. The lower edge region of the ceiling frame 15 is accommodated by the seal 19. Provided the fittings have not already been mounted on the ceiling 14 or the ceiling frame 15 and therefore already in place, further fittings in the roof region may be mounted from above.

Figure 4:
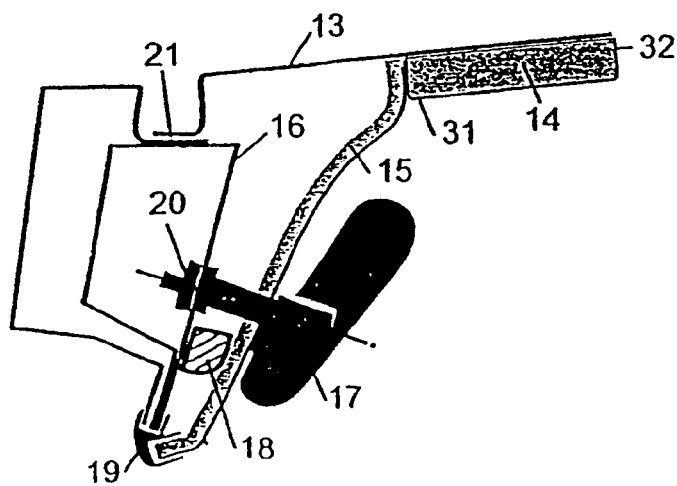

Shown in FIG. 4, also in cross-section, is the outer skin 13 of the roof which is mounted in a further production step onto the longitudinal frame 16, which is part of the basic structure 10. The outer skin 13 can be lowered from above onto the longitudinal frame. The outer skin 13 and the cross members 11 and 12 shown in FIG. 1 are permanently joined to the basic structure 10 at the seam 21 e.g. by adhesive bonding and/or welding.

Figure 5:
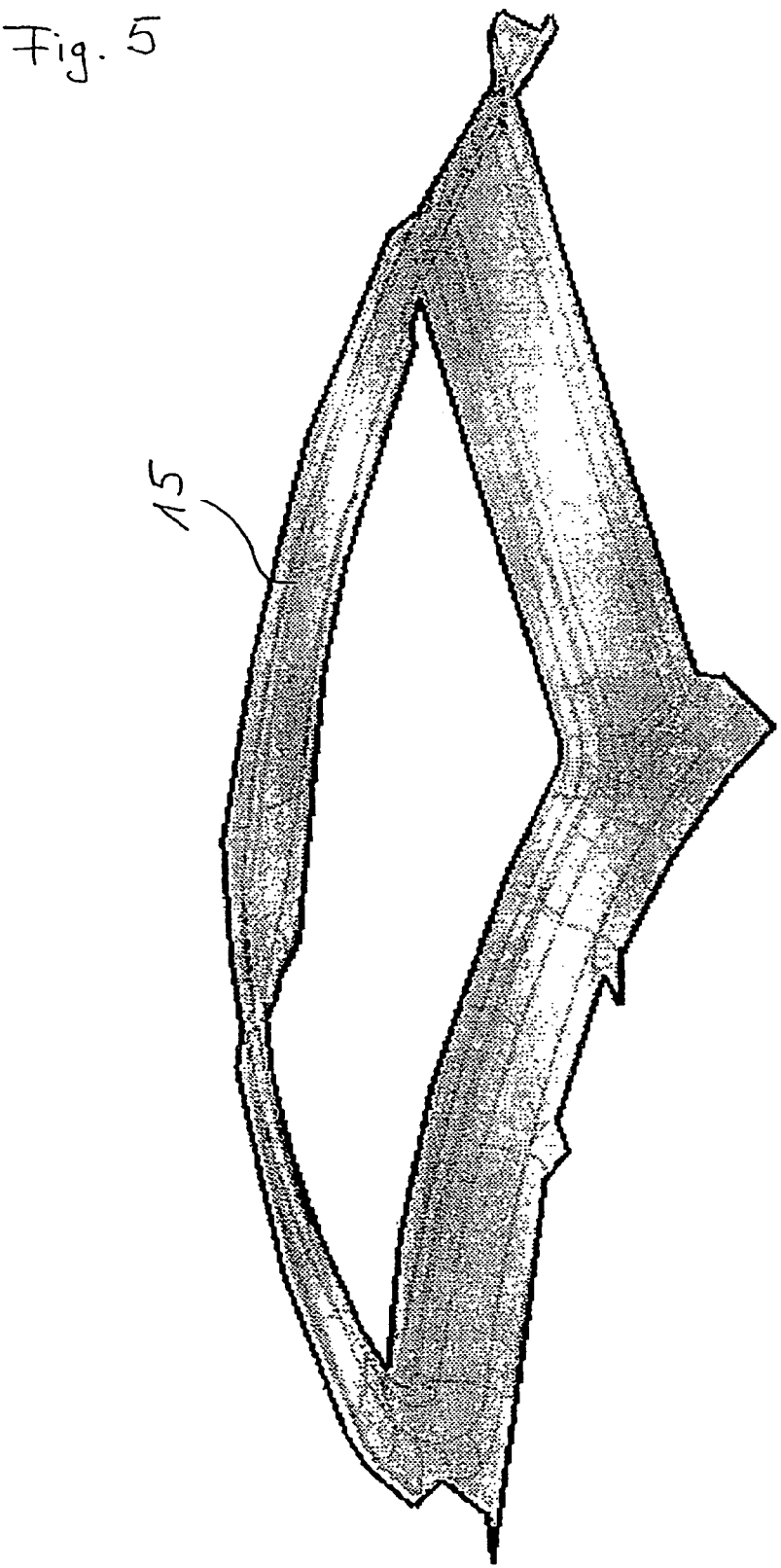
FIGS. 5 to 7 showing a second version of the assembly of a roof unit on a basic structure where the ceiling and outer skin already form a unit with the basic structure prior to installation.

FIG. 5 shows a ceiling frame 15 which may be of one or a plurality of parts, preferably one part. The ceiling frame 15 may e.g. be a shaped part of metal such as a pressure diecasting, or a foamed body such as an integral foam body etc.

Figure 6:
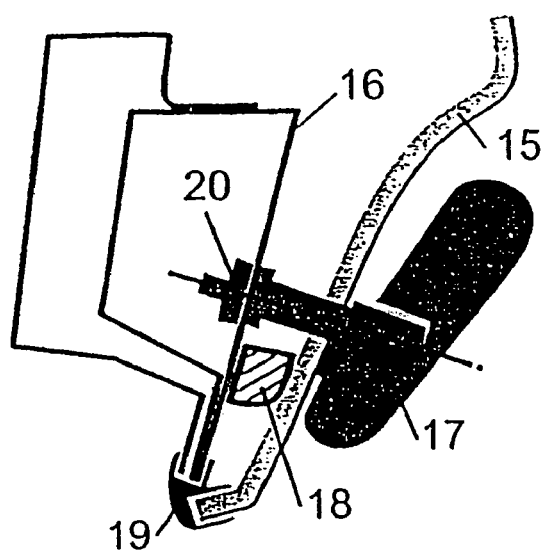

FIG. 6 shows a cross-section through a longitudinal frame 16 of basic structure 10; the ceiling frame 15 along with airbag module 18 are mounted by way of the connecting element 20 to which the hand grip 17 is attached. The lower edge of the ceiling frame is accommodated by the profiled seal 19. The ceiling frame 15 may be introduced into the basic structure e.g through the front or rear window opening and raised to the connecting points on the longitudinal frame 16 and the cross members. The ceiling frame 15 may e.g. also be introduced by tilting and lowering into the basic structure before being raised again to the matching connecting points on the longitudinal frame 16 and the criss members.

Figure 7:
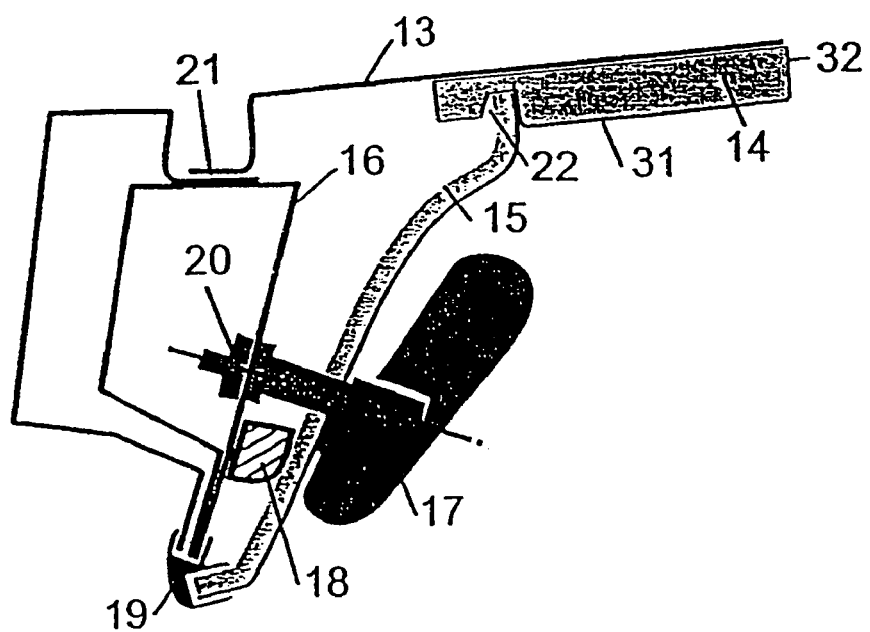

FIG. 7 shows a further assembly step beyond that shown in FIG. 6 in which a unit—comprising the outer skin 13 already attached to the ceiling 14 is mounted on the ceiling frame 15 and the roof frame (containing both longitudinal frame members 16, the front cross members 11 and rear cross member 12)—jointed permanently to the roof frame at seam 21 by adhesive bonding and/or welding. The ceiling has a notch 22 in which the ceiling frame 15 engages.

Figure 8:
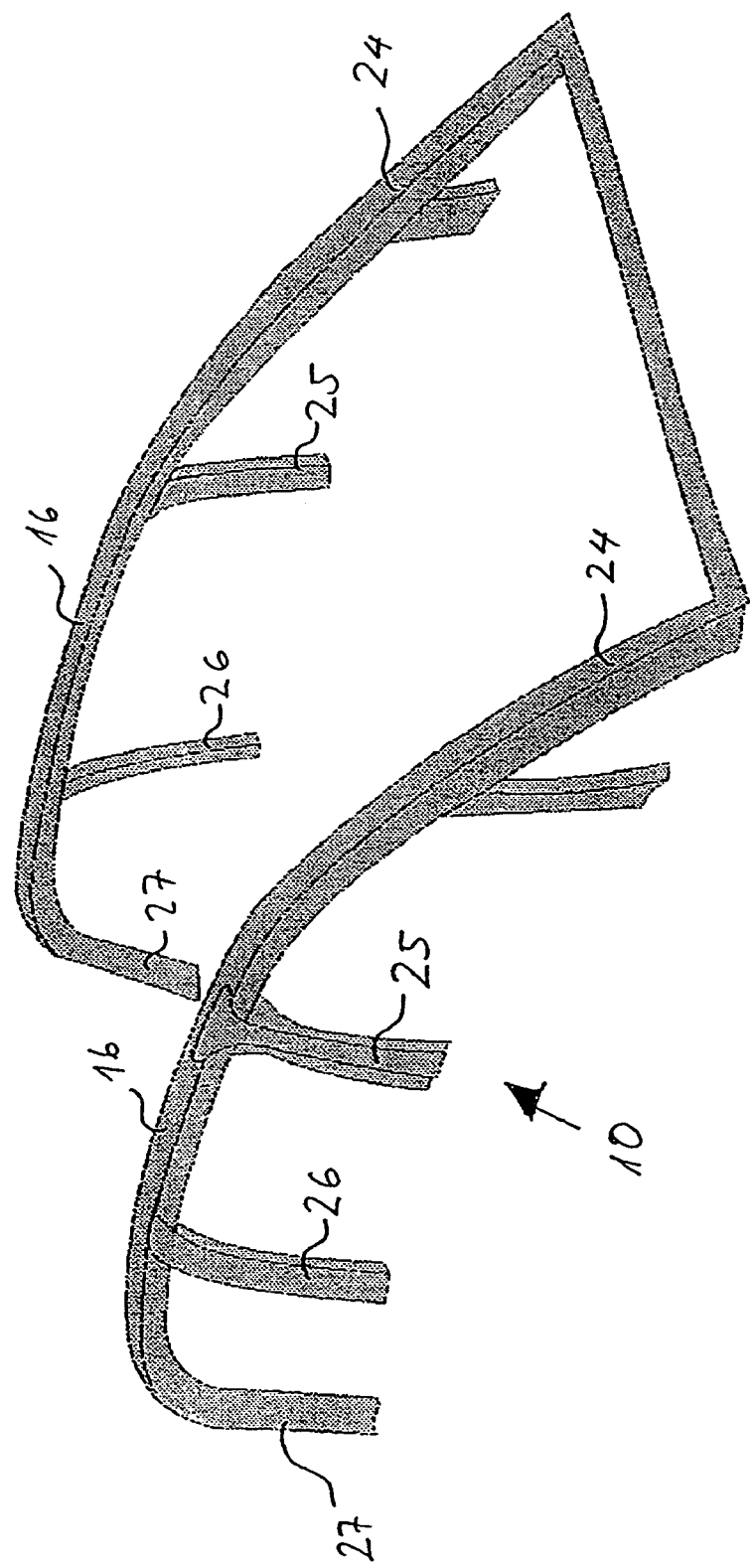
FIGS. 8 to 13 showing a third version of the assembly of a roof unit on a basic structure where the roof unit already contains the ceiling, the ceiling frame, the outer skin and both cross members and represents a complete unit. Apart from its installation on the basic structure, the roof unit requires no further work to it.

Shown in FIG. 8 are the relevant parts of a basic structure 10 of a vehicle body including side wall columns 24, 25, 26, 27 and the longitudinal frame 16. This differs from that shown in FIG. 1 in that the front and rear cross members 11 and 12 are missing.

Figure 9:
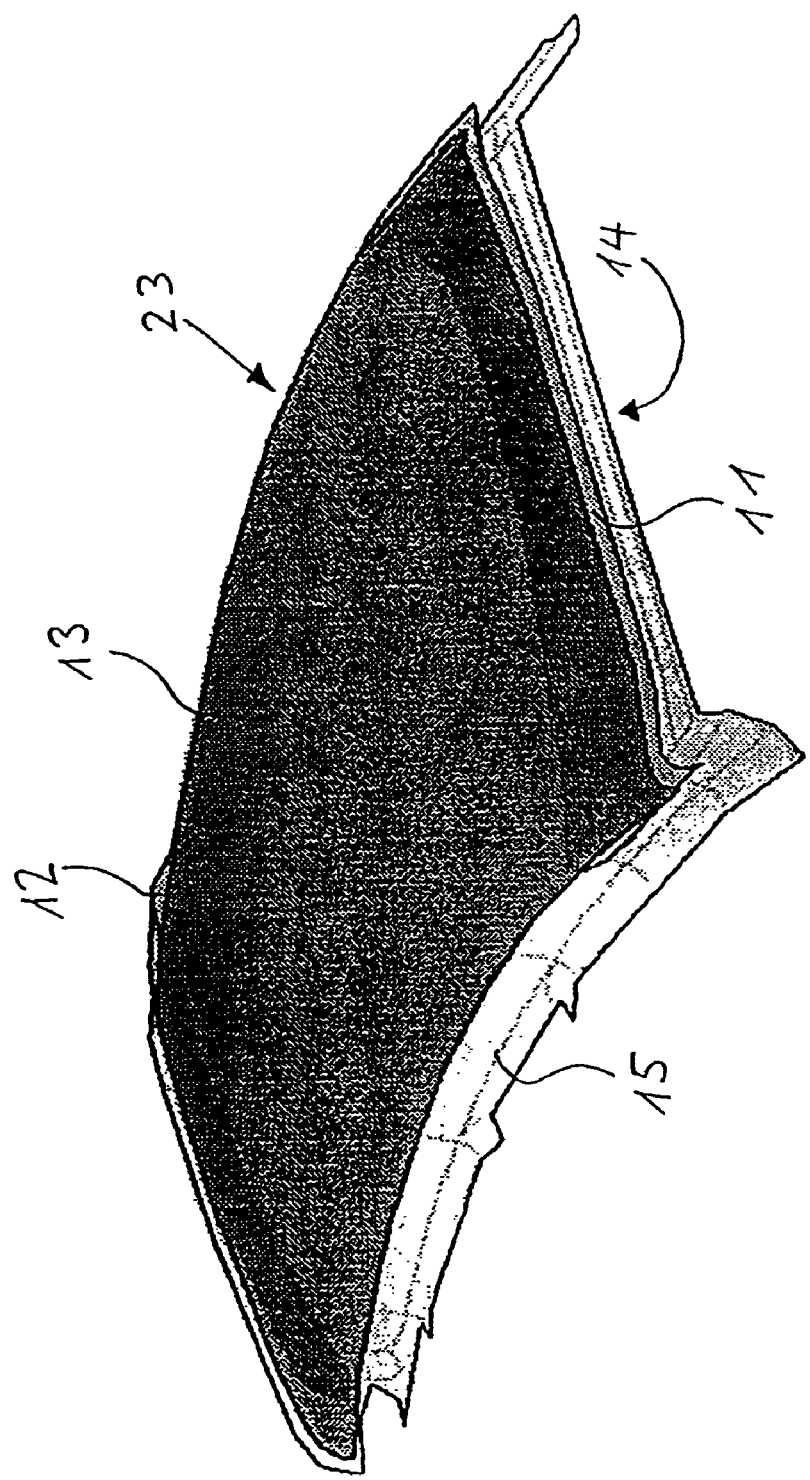

FIG. 9 shows a fully installed roof unit 23 with ceiling 14, ceiling frame 15, outer skin 13, rear cross member 12 and front cross member 11. The roof unit 23 may also include interior fittings not shown here such as e.g. wiring, holding grips, sun shields, interior lighting, operating and display elements, sliding, raising, folding and lamellar roofs, or rigid or moveable glass roofs and their frame parts as well as driving mechanisms for moveable roofs.

Figure 10:
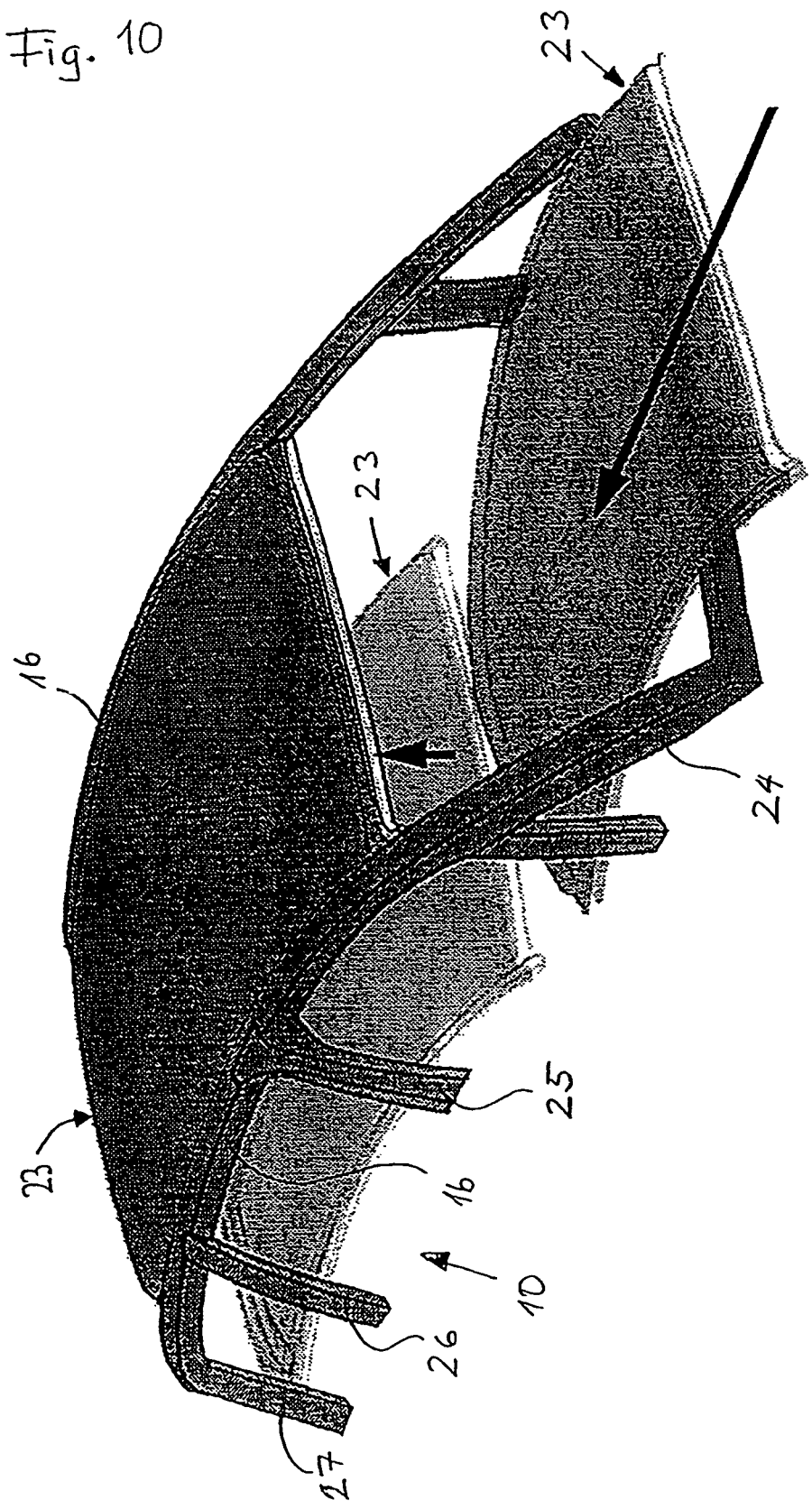

FIG. 10 shows the mounting of the roof unit 23 shown in FIG. 9 to the basic structure 10. For that purpose the roof unit 23 is introduced e.g. from the front between the two columns 24 into the interior of the vehicle in the direction of the arrow, then subsequently raised up until the roof unit 23 and the basic structure 10 touch at the matching points of joining.

Figure 11:
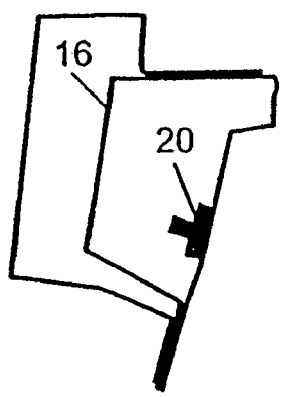

FIG. 11 shows the cross-section of one of the two longitudinal frame members 16 before fitting on the roof unit 23 shown in FIG. 10.

Figure 12:
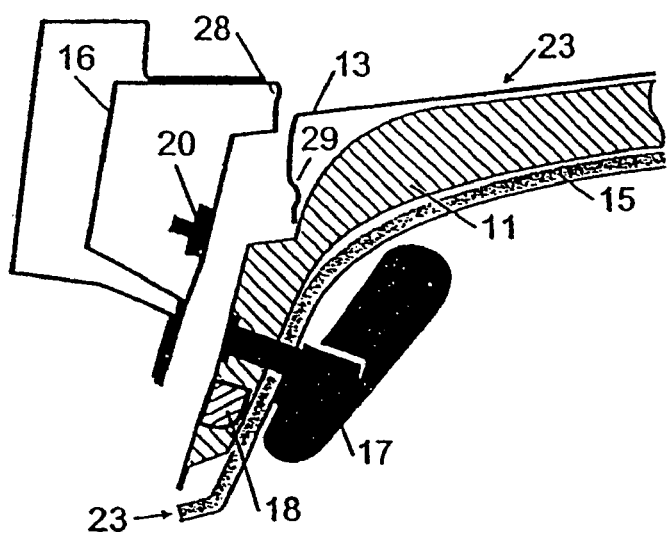
Figure 13:
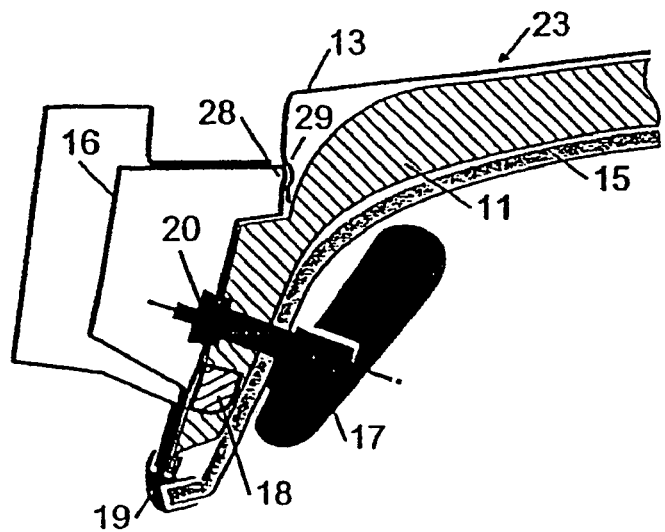

FIGS. 12 and 13 show in cross-section the vertical fitting of roof unit 23 according to FIG. 10. The roof unit 23 is raised to the roof frame of the basic structure 10 until it touches it. The groove 29 and the corresponding bulge 28 may be provided over the whole length of the roof unit 23 or longitudinal frame members 16 and cross members 11, 12. On raising the roof unit 23 further the bulge 28 fits into the groove 29. This first connection may be fixed further by connection of the hand grips 17 to the connecting elements 20. At joints such as in the region of the bulge 28 and groove 29 further means of joining may be employed and the longitudinal frame members 16 for example welded, adhesively bonded, bolted, clipped etc. to the roof skin 13. The other parts which have not been mentioned can be identified from the reference numbers in the previous figures.

Figure 14:
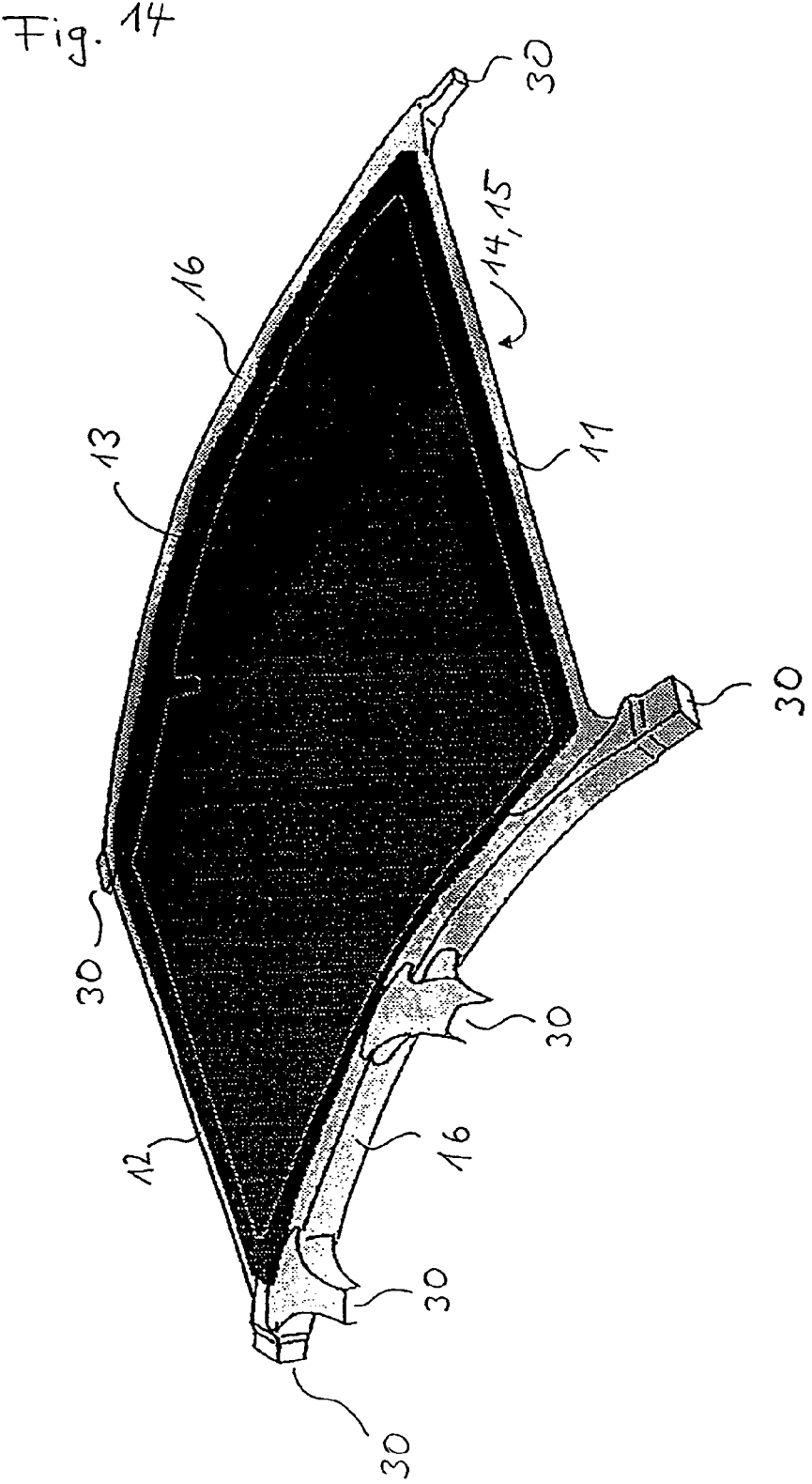
FIGS. 14 and 15 showing a fourth version of the assembly of a roof unit on a basic structure where the roof unit contains the complete roof frame.

FIG. 14 shows a further possible version of a roof assembly unit whereby this roof unit, in addition to the components in the roof unit 23, contains both longitudinal frame members 16 which along with the cross members 11 and 12 form a closed roof frame. In the roof unit shown in FIG. 14 the side wall airbag module 18, the connecting elements 20 etc., are already connected to the longitudinal members 16. Further, the roof unit in FIG. 14 features the connecting means 30 which permit the roof unit to be joined to the basic structure 10 shown in the next figure viz., FIG. 15.

Figure 15:
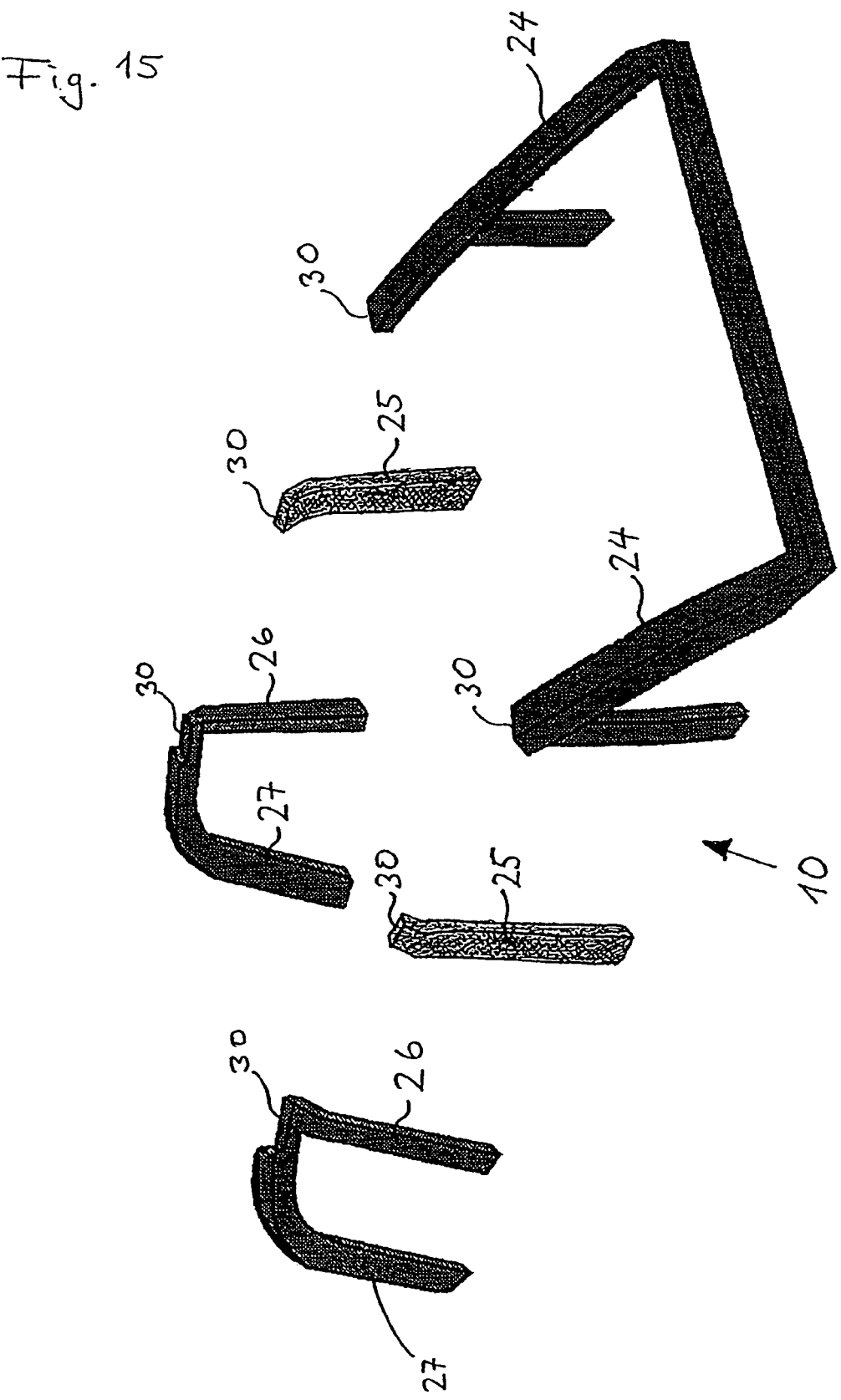

FIG. 15 shows the basic structure 10 relating to FIG. 14, which contains the side columns of the car body, A column 24, B column 25, C column 26 and D column 27. At the upper ends of the side columns are the corresponding connecting means 30. Further vehicle components on the basic structure in FIG. 15 were omitted here.

Figure 16:
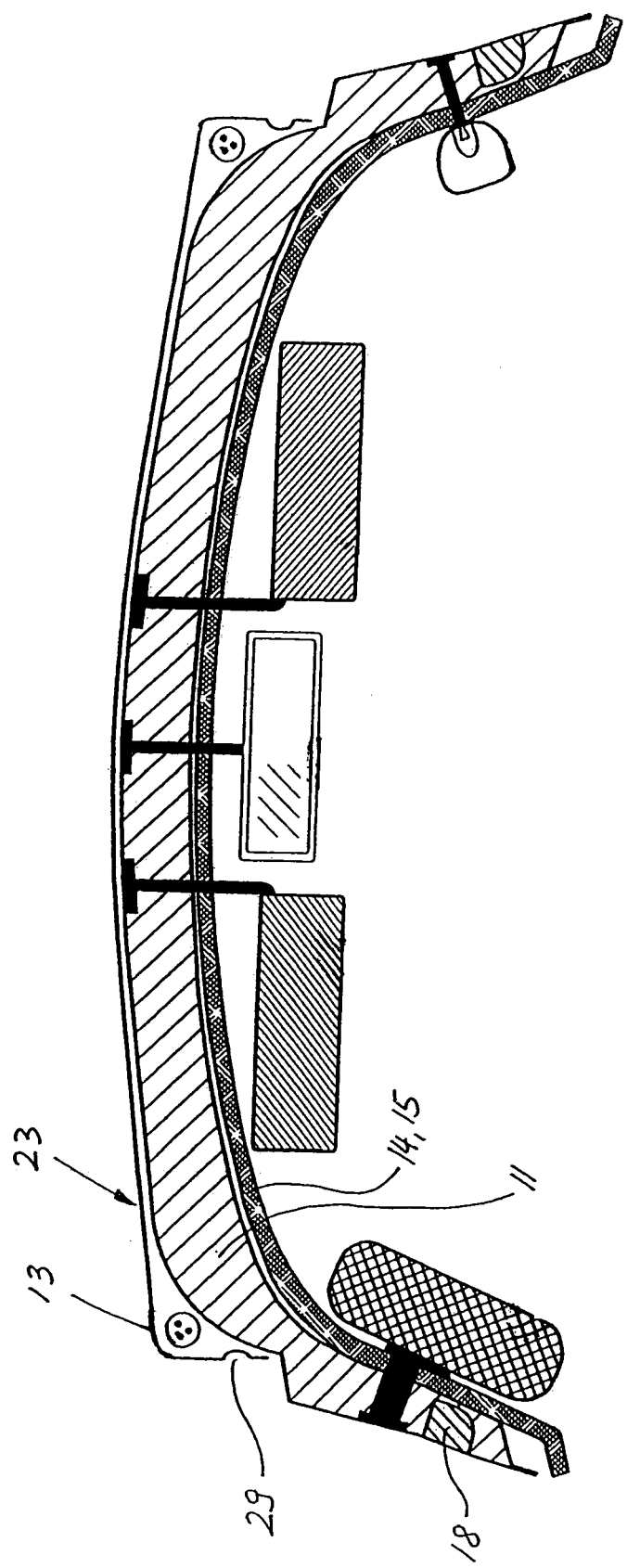
FIG. 16 shows a cross-section of the assembly having fittings.

FIG. 16 shows a cross-section through the assembly illustrating a sun shield, an interior rear view mirror, a ceiling cover, interior lighting and cushioning as well as wiring as fittings in the assembly.

Figure 17:
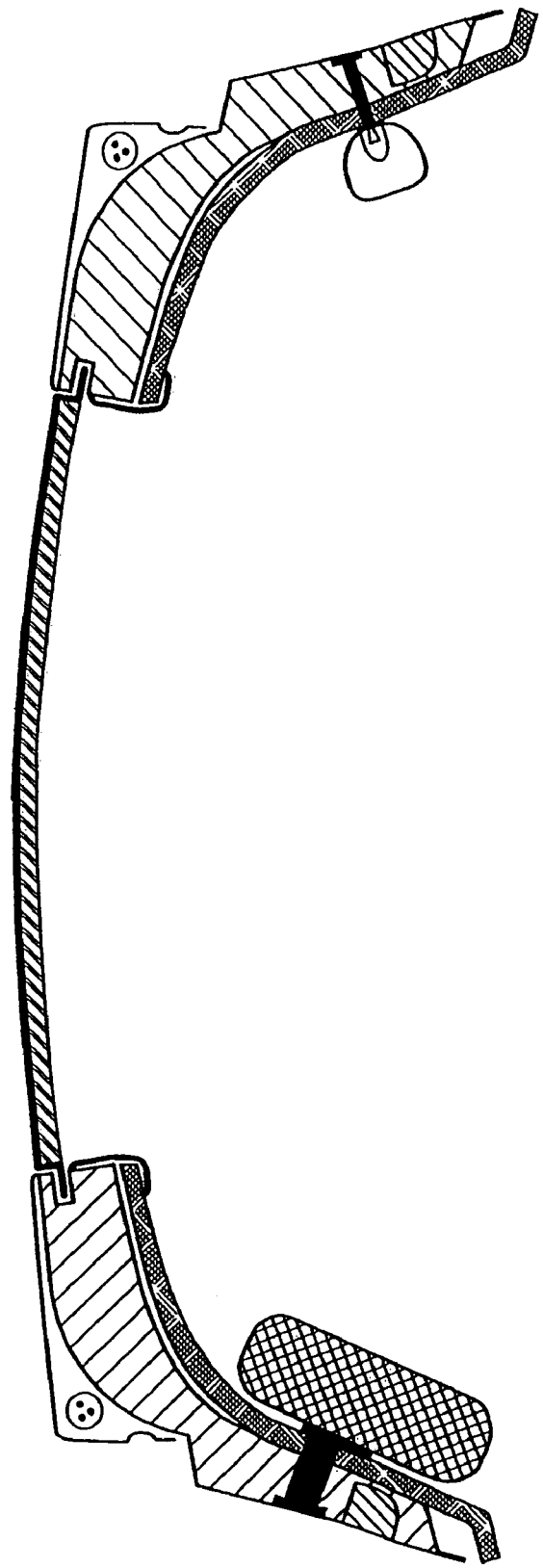
FIG. 17 is a view as in FIG. 16 showing a sliding roof.
Figure 18:
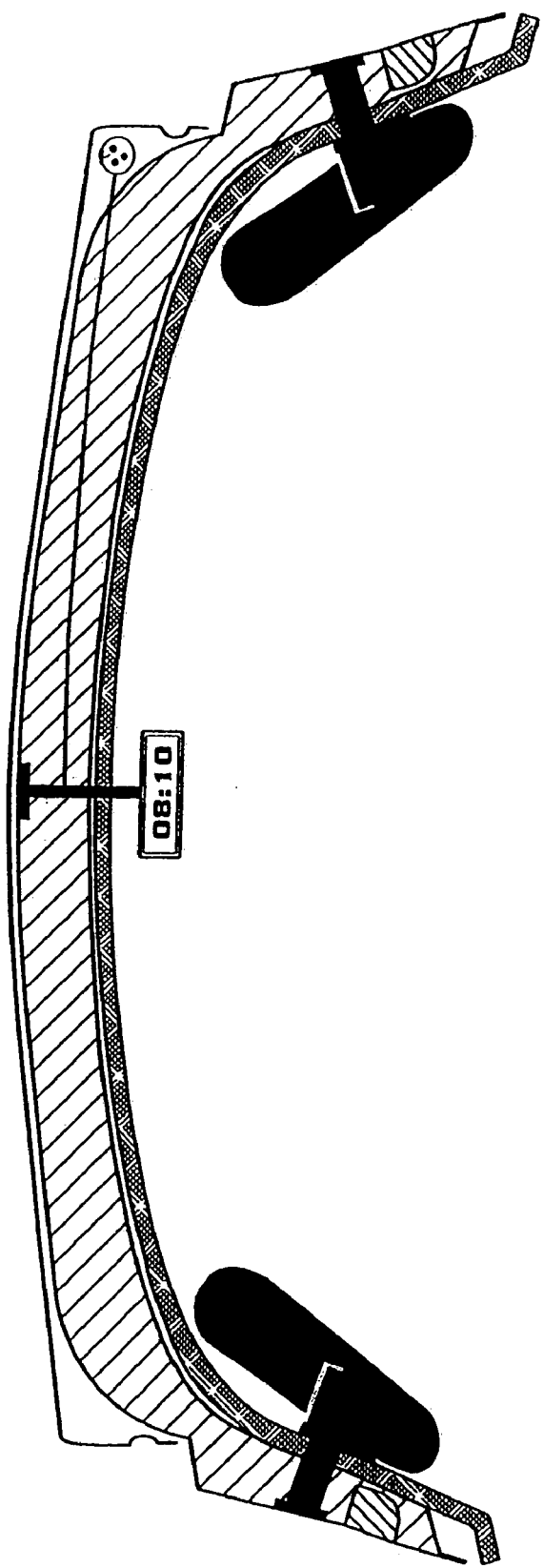
FIG. 18 is a view as in FIG. 16 showing operating and display elements.

FIG. 17 shows a sliding roof in the roof assembly while FIG. 18 shows a display element and wiring in the roof assembly.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The invention claimed is:

1. A roof unit, comprising:

an outer skin;

an inward facing ceiling, whereby the outer skin and the ceiling are combined to form a unit ready for installation;

a base structure having longitudinal frames, the ceiling and the outer skin along with the basic structure having joining configurations that mate the ceiling and the outer skin to the base structure at mutual places of joining, the ceiling having a sandwich structure comprising a middle layer of foam, at least one side of the middle layer being provided with one of a fiber mat and a glass fiber fleece and at least one of a plastic film, a cover film, a decorative overlay and a functional overlay, the roof unit and the longitudinal frames having a groove and a bulge, respectively, the groove and the bulge being provided over an entire length of the roof unit or the longitudinal frames, the bulge being configured to correspond to and fit into the groove;

at least one fitting from the group of fittings consisting of sliding, raising, folding, lamellar and glass roofs, frame parts and drive elements for roofs;

a connecting element attached to the longitudinal frame; and a hand grip attached to the connecting element so as to further fix together the bulge and the groove.

* * * * *